(12) United States Patent
Takahashi et al.

(10) Patent No.: US 7,236,450 B2
(45) Date of Patent: Jun. 26, 2007

(54) RECORDING MEDIUM HAVING RESIN SUBSTRATE

(75) Inventors: Hideaki Takahashi, Higashine (JP); Tetsuo Hosokawa, Higashine (JP)

(73) Assignee: Fujitsu Limited, Kawasaki (JP)

( * ) Notice: Subject to any disclaimer, the term of this patent is extended or adjusted under 35 U.S.C. 154(b) by 816 days.

(21) Appl. No.: 10/358,819

(22) Filed: Feb. 5, 2003

(65) Prior Publication Data
US 2004/0027967 A1 Feb. 12, 2004

(30) Foreign Application Priority Data
Aug. 8, 2002 (JP) ............................. 2002-231143

(51) Int. Cl.
*G11B 7/24* (2006.01)
(52) U.S. Cl. .................... 369/275.5; 369/283
(58) Field of Classification Search ............... 369/100, 369/284, 286, 288, 275.3, 275.4, 275.5, 283, 369/275.1; 428/64.1, 64.8, 64.4; 430/270.11
See application file for complete search history.

(56) References Cited

U.S. PATENT DOCUMENTS

| | | | | |
|---|---|---|---|---|
| 5,118,541 A | * | 6/1992 | Yamamoto et al. | 428/64.8 |
| 5,878,022 A | * | 3/1999 | Okada et al. | 369/275.4 |
| 6,037,099 A | * | 3/2000 | Oogo et al. | 430/270.11 |
| 6,383,595 B1 | * | 5/2002 | Hirotsune et al. | 428/64.1 |
| 6,657,948 B1 | * | 12/2003 | Tajima et al. | 369/286 |

FOREIGN PATENT DOCUMENTS

| | | |
|---|---|---|
| JP | 04-307440 | 10/1992 |
| JP | 08-031011 | 2/1996 |
| JP | 11-016211 | 1/1999 |
| JP | 2000-003524 | 1/2000 |

* cited by examiner

*Primary Examiner*—Andrea Wellington
*Assistant Examiner*—Kim-Kwok Chu
(74) *Attorney, Agent, or Firm*—Greer, Burns & Crain, Ltd.

(57) ABSTRACT

A recording medium including a resin substrate having a first thermal expansion coefficient, a center hole, a first surface, and a second surface opposite to the first surface, a recording layer formed on the first surface of the resin substrate and having a recording region, an inner nonrecording region formed inside the inner periphery of the recording region, and an outer nonrecording region formed outside the outer periphery of the recording region, and a protective layer formed on the second surface of the resin substrate except an inner peripheral region having a predetermined range from the center hole, the recording region, and the outer nonrecording region. The thermal deformation suppressing layer has a second thermal expansion coefficient smaller than the first thermal expansion coefficient.

17 Claims, 8 Drawing Sheets

RECORDING MEDIUM HAVING RESIN SUBSTRATE

BACKGROUND OF THE INVENTION

1. Field of the Invention

The present invention relates to a recording medium having a resin substrate.

2. Description of the Related Art

As a method of increasing the recording density of an optical disk, examinations have been made on increasing the numerical aperture (NA) of an objective lens and shortening the wavelength of a laser to be used. In a 3.5-inch magneto-optical disk drive being used at present, the numerical aperture of an objective lens is 0.55. By increasing the numerical aperture of the objective lens up to 0.70, the size of a beam spot can be reduced from about 1.0 μm as a conventional size to 0.78 μm. A similar effect can be obtained by shortening the wavelength of a laser to be used. By changing a laser having a wavelength of 650 nm being used at present into a blue-violet laser having a wavelength of 405 nm, the conventional beam spot size can be reduced from about 1.0 μm to 0.65 μm. As a result, the marks on the optical disk can be shortened and the track pitch can be narrowed to thereby allow high-density recording.

In the case of applying such means for allowing high-density recording, it is known that the margin to the warpage of a resin substrate due to its thermal deformation not particularly becoming a problem in the prior art is reduced. This is due to the fact that even if the warpage of a single-layer resin substrate is the same in level, optical aberration becomes likely to occur because of the increasing of the numerical aperture or the shortening of the wavelength, causing a perturbation of the shape of a beam spot and therefore largely interfering with stable recording and reproducing operations. Further, regarding the problem of optical aberration due to the increasing of the numerical aperture, the optical aberration is sensitive to variations in thickness of the conventional resin substrate having a thickness of 1.2 mm, causing an extremely large amount of optical aberration due to variations in thickness of the resin substrate.

Therefore, it is essential to reduce the thickness of the substrate in the case of using an objective lens having a high numerical aperture. However, when the thickness of the substrate is reduced, the warpage due to thermal deformation tends to become large, so that optical aberration due to the warpage instead becomes likely to occur. In a conventional 3.5-inch magneto-optical disk, a recording layer is formed on a first surface of a transparent resin substrate in the range of 18 to 42 mm along the radius of the substrate from the center thereof. This recording layer and a second surface of the resin substrate as an incident surface for a laser beam are coated with organic protective films.

Japanese Patent Laid-open No. Hei 11-16211 discloses a method of suppressing the warpage of a resin substrate by forming a thermal deformation suppressing film having a thermal expansion coefficient smaller than that of the resin substrate on the second surface of the resin substrate in the same radial range as that of the recording layer formed on the first surface of the resin substrate to thereby suppress the thermal deformation of the resin substrate. However, in the case of applying this method to a polycarbonate substrate being widely used for an optical disk, moisture is absorbed into the polycarbonate substrate from a position where the recording layer and the thermal deformation suppressing film are not formed.

The moisture once absorbed into the polycarbonate substrate is hard to expel to the atmosphere with the medium configuration that the substrate is closed by the recording layer and the thermal deformation suppressing film as moisture resistant materials. Accordingly, when a sudden rise in temperature occurs, the moisture is expelled to the boundary between the polycarbonate substrate and the recording layer. As a result, there is a possibility of corrosion of the recording layer. This problem is remarkable particularly in a substrate formed of polycarbonate resin or amorphous polyolefin resin having low birefringence and low saturated moisture absorbance as applied to an optical disk for high-density recording. The moisture absorbed or gas contained in such a resin is generated from the boundary between the recording layer and the resin substrate and the boundary between the thermal deformation suppressing film and the resin substrate by a sudden rise in ambient temperature. As a result, the recording layer and the thermal deformation suppressing film are separated from the resin substrate by the pressure of the moisture or gas generated, causing a semispherical dilation on the substrate, resulting in recording and reproducing errors. This phenomenon is due to the fact that the moisture absorbed in such a resin having low saturated moisture absorbance is hard to move therein, so that the moisture or gas is prone to be expelled to the nearest boundary.

There is another problem of loss in optical characteristics. That is, although the thermal deformation suppressing film is transparent, there is a power loss of the laser beam due to reflection or absorption because the thermal deformation suppressing film is formed on the incident surface for the laser beam. The power loss of the laser beam causes a reduction in the margin to high-speed recording and reproduction by high-speed rotation of the optical disk. To cope with the corrosion of the recording layer and the loss in optical characteristics, Japanese Patent Laid-open No. Hei 1-292639 discloses a medium configuration that a thermal deformation suppressing film is formed on the second surface of a resin substrate in the radial range from the innermost circumference of the substrate to a position corresponding to the inner periphery of a recording region of a recording layer formed on the first surface of the substrate in such a manner that the thermal deformation suppressing film does not overlap the recording region.

This medium configuration in the prior art will now be described more specifically with reference to FIG. 1. Reference numeral 2 generally denotes a recording medium. The recording medium 2 includes a transparent resin substrate 4 having first and second surfaces opposite to each other. A recording layer 6 is formed on the first surface of the resin substrate 4. The resin substrate 4 has a center hole 5. A thermal deformation suppressing film 8 is formed on the second surface of the resin substrate 4 in the radial range from the center hole 5 to a position corresponding to the inner periphery of a recording region of the recording layer 6. Accordingly, the thermal deformation suppressing film 8 does not overlap the recording region of the recording layer 6. With this configuration that the thermal deformation suppressing film 8 is formed radially inside of the recording region, the resin substrate 4 is not closed by the recording layer 6 and the thermal deformation suppressing film 8 at the recording region, thereby preventing the corrosion of the recording layer 6. Furthermore, since the thermal deformation suppressing film 8 is formed outside the incident region for a laser beam, there is no problem of optical loss.

However, in this configuration that the thermal deformation suppressing film 8 is formed so as to radially range from the center hole 5 to the inner periphery of the recording region of the recording layer 6, the thermal deformation suppressing film 8 comes into contact with a reference plane of a spindle 12 in an optical disk drive as shown by an arrow 14, causing separation of the thermal deformation suppressing film 8 from the substrate 4. As a result, dust is prone to generate and the flatness of a contact portion between the recording medium 2 and the reference plane of the spindle 12 is lost to result in difficulty of stable recording and reproducing operations. This problem of separation of the thermal deformation suppressing film 8 may be solved by coating an organic protective film so as to cover the thermal deformation suppressing film 8.

However, the contact portion between the thermal deformation suppressing film 8 and the reference plane of the spindle 12 is a ring-shaped region at the innermost circumference of the substrate, so that a high peripheral speed of the substrate cannot be obtained in using a rotary applicator for coating the organic protective film, and it is therefore difficult to coat the organic protective film with a uniform thickness. Further, there is a problem in durability of the thermal deformation suppressing film in the case that it is not coated with the organic protective film. For example, daily cleaning of the laser beam incident surface of the optical disk by a user is carried out by using a cleaning agent containing alcohol and a wiping cloth or soft paper in many cases.

If the adhesion of the thermal deformation suppressing film to the resin substrate is low, separation of the thermal deformation suppressing film by the work of wiping off the cleaning agent is prone to occur. To verify this fact, the adhesion of the thermal deformation suppressing film was evaluated by a wipe test. More specifically, an SiN film having a thickness of 165 nm as the thermal deformation suppressing film was formed on a polycarbonate substrate by sputtering to evaluate the adhesion of the SiN film by the wipe test. The wipe test was made by wiping the SiN film with a swab impregnated with ethanol until the SiN film was separated off. In this wipe test, a load of 100 g was applied to the swab and wiping speed was set to 500 mm/min. Thus, the above-mentioned disk cleaning work is replicated. As the result of this wipe test, the SiN film was separated off by five reciprocating stokes of the swab. This result shows the necessity of the organic protective film for the thermal deformation suppressing film.

There is another problem in coating the organic protective film. In forming the thermal deformation suppressing film, the deposition of projecting foreign matter in or on the thermal deformation suppressing film is unavoidable. In a conventional coating method for the organic protective film, a line defect due to the projecting foreign matter appears on the organic protective film. The line defect extends from the projecting foreign matter toward the outer circumference of the organic protective film.

SUMMARY OF THE INVENTION

It is therefore an object of the present invention to provide a recording medium using a resin substrate wherein the warpage of the substrate due to a change in ambient temperature can be suppressed.

In accordance with an aspect of the present invention, there is provided a recording medium including a resin substrate having a first thermal expansion coefficient, a center hole, a first surface, and a second surface opposite to the first surface; a recording layer formed on the first surface of the resin substrate, the recording layer having a recording region, an inner nonrecording region formed inside the inner periphery of the recording region, and an outer nonrecording region formed outside the outer periphery of the recording region; a protective layer formed on the first surface of the resin substrate so as to cover the recording layer; and a thermal deformation suppressing layer formed on the second surface of the resin substrate except an inner peripheral region having a predetermined range from the center hole, the recording region, and the outer nonrecording region, the thermal deformation suppressing layer having a second thermal expansion coefficient smaller than the first thermal expansion coefficient.

Preferably, the resin substrate is circular, and the recording layer is optically recordable. The recording layer has a third thermal expansion coefficient smaller than the first thermal expansion coefficient. Preferably, the second thermal expansion coefficient is smaller than the third thermal expansion coefficient. The thermal deformation suppressing layer is formed of SiN, for example. Preferably, the thermal deformation suppressing layer is formed in the range of 13.5 to 22 mm along the radius of the resin substrate from the center thereof, more preferably in the range of 17 to 22 mm along the radius of the resin substrate from the center thereof. Preferably, a second protective layer is formed on the second surface of the resin substrate so as to cover the thermal deformation suppressing layer. The thermal deformation suppressing layer is bonded to the resin substrate or formed by sputtering, evaporation, or printing.

In accordance with another aspect of the present invention, there is provided a recording medium including a resin substrate having a first thermal expansion coefficient, a first center hole, a first surface, and a second surface opposite to the first surface; a recording layer formed on the first surface of the resin substrate, the recording layer having a recording region, an inner nonrecording region formed inside the inner periphery of the recording region, and an outer nonrecording region formed outside the outer periphery of the recording region; a thermal deformation suppressing layer formed on the second surface of the resin substrate except an inner peripheral region having a predetermined range from the first center hole, the recording region, and the outer nonrecording region, the thermal deformation suppressing layer having a second thermal expansion coefficient smaller than the first thermal expansion coefficient; and a dummy resin substrate bonded to the first surface of the resin substrate, the dummy resin substrate having a second center hole aligned to the first center hole.

In accordance with a further aspect of the present invention, there is provided a recording medium including a resin substrate having a first thermal expansion coefficient, a first center hole, and a first surface; a recording layer formed on the first surface of the resin substrate, the recording layer having a recording region, an inner nonrecording region formed inside the inner periphery of the recording region, and an outer nonrecording region formed outside the outer periphery of the recording region; a dummy resin substrate bonded to the first surface of the resin substrate, the dummy resin substrate having a surface opposed to the first surface of the resin substrate and a second center hole aligned to the first center hole; and a thermal deformation suppressing layer formed on the opposed surface of the dummy resin substrate except an inner peripheral region having a predetermined range from the second center hole, a region corresponding to the recording region, and a region corresponding to the outer nonrecording region, the thermal deformation suppressing layer having a second thermal expansion coefficient smaller than the first thermal expansion coefficient.

In accordance with a still further aspect of the present invention, there is provided an optical storage device capable of at least reading information recorded on an optical recording medium, including a light source for emitting a light beam; an optical head for focusing the light beam on the optical recording medium; and a photodetector for generating a reproducing signal from light reflected on the optical recording medium according to the light beam; the optical recording medium including a resin substrate having a first thermal expansion coefficient, a center hole, a first surface, and a second surface opposite to the first surface; a recording layer formed on the first surface of the resin substrate, the recording layer having a recording region, an inner nonrecording region formed inside the inner periphery of the recording region, and an outer nonrecording region formed outside the outer periphery of the recording region; a protective layer formed on the first surface of the resin substrate so as to cover the recording layer; and a thermal deformation suppressing layer formed on the second surface of the resin substrate except an inner peripheral region having a predetermined range from the center hole, the recording region, and the outer nonrecording region, the thermal deformation suppressing layer having a second thermal expansion coefficient smaller than the first thermal expansion coefficient.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
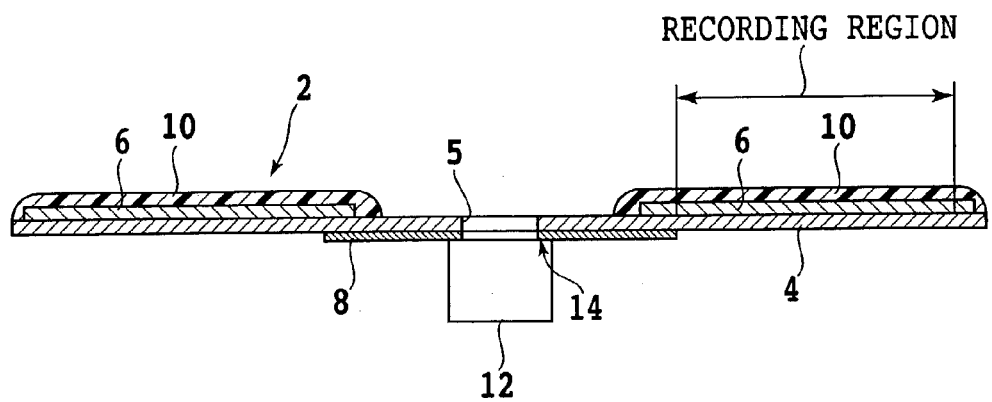
FIG. 1 is a sectional view of a recording medium in the prior art.
Figure 2:
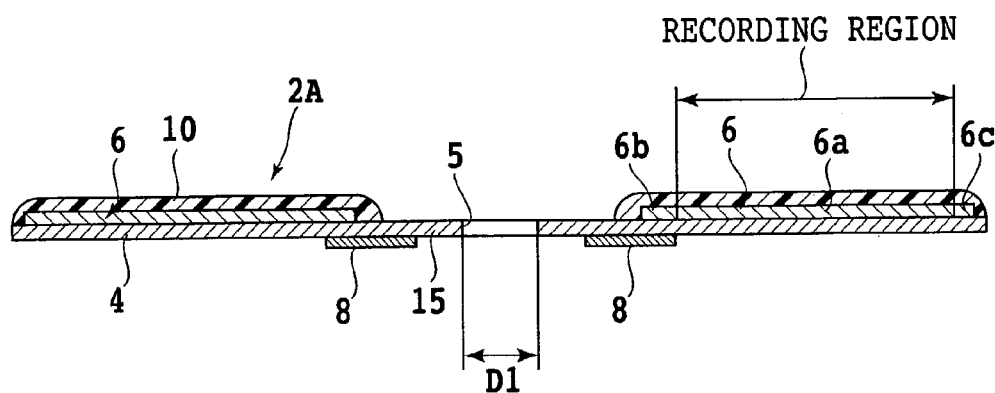
FIG. 2 is a sectional view of a recording medium according to a first preferred embodiment of the present invention.

Some preferred embodiments of the present invention will now be described in detail with reference to the drawings. In the following description of each preferred embodiment, the same parts as those in the prior art shown in FIG. 1 are denoted by the same reference numerals, and the description therefor will be omitted. Referring to FIG. 2, there is shown a sectional view of a recording medium 2A according to a first preferred embodiment of the present invention. The recording medium 2A is an optical disk or a magneto-optical disk, for example. In this specification, a 3.5-inch magneto-optical disk is used as an example. The length of 3.5 inches is equal to $3.5 \times 2.54 \approx 8.89 \approx$ about 9 cm.

Reference numeral 4 denotes a transparent resin substrate formed of polycarbonate, for example. The resin substrate 4 has a first surface and a second surface opposite to the first surface. A recording layer 6 is formed on the first surface of the resin substrate 4. The resin substrate 4 has a center hole 5 having a diameter D1=15 mm, and has a first thermal expansion coefficient. The recording layer 6 includes a magnetic film formed of TbFeCo, for example. The recording layer 6 has a recording region 6a, an inner nonrecording region 6b formed radially inside of the recording region 6a, and an outer nonrecording region 6c formed radially outside of the recording region 6a. An optical head is moved inside the recording region 6a to record/reproduce data to/from the recording layer 6.

The recording layer 6 is formed in the range of 18 to 42 mm along the radius of the disk-shaped recording medium 2A from the center thereof. The resin substrate 4 has a thickness of 0.6 mm, and its thermal deformation is relatively large. A thermal deformation suppressing film or layer 8 is formed on the second surface of the resin substrate 4 except an inner circumferential region 15 having a predetermined radial range from the center hole 5, the recording region 6a, and the outer nonrecording region 6c. The thermal deformation suppressing film 8 has a second thermal expansion coefficient smaller than the first thermal expansion coefficient of the resin substrate 4. The thermal deformation suppressing film 8 is formed of SiN, for example, by sputtering, evaporation, or the like. An organic protective film 10 is formed on the first surface of the resin substrate 4 so as to fully cover the recording layer 6.

The thermal deformation suppressing film 8 is formed in the radial range of 17 to 22 mm from the center of the resin substrate 4. In the prior art shown in FIG. 1, the thermal deformation suppressing film 8 is formed in the radial range of 7.5 to 22 mm from the center of the resin substrate 4. By using the recording media 2A and 2 with the above arrangement of the thermal deformation suppressing films 8, the dependence of the amount of thermal deformation of each recording medium upon the thickness of each film 8 was measured under the conditions where the thickness of each film 8 was varied from 0 to 300 nm and the temperature of each recording medium was raised from 25° C. to 55° C. The above-mentioned radial range of each film 8 corresponds to that for a 3.5-inch recording medium.

Figure 3:
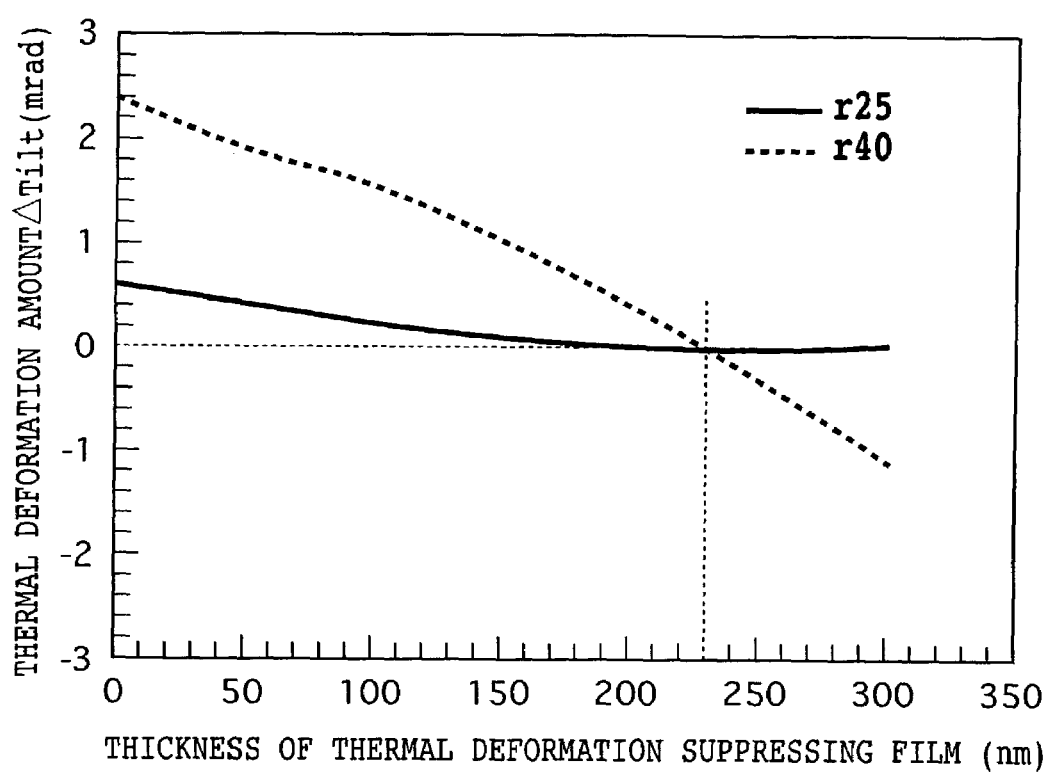
FIG. 3 is a graph showing the dependence of the amount of thermal deformation of the recording medium according to the first preferred embodiment upon the thickness of a thermal deformation suppressing film.
Figure 4:
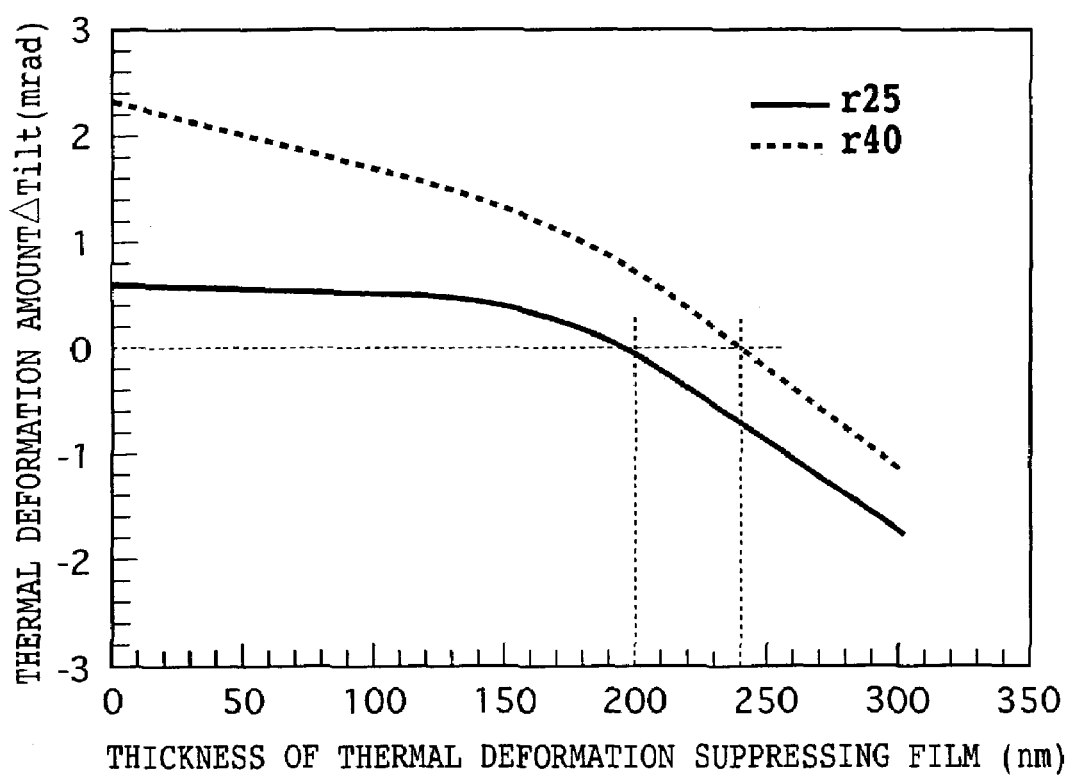
FIG. 4 is a graph showing the dependence of the amount of thermal deformation of the recording medium in the prior art upon the thickness of a thermal deformation suppressing film.

FIG. 3 shows the dependence of the thermal deformation amount of the recording medium 2A according to the first preferred embodiment upon the thickness of the thermal deformation suppressing film 8 of the medium 2A. The radial range of the thermal deformation suppressing film 8 of the recording medium 2A is 17 to 22 mm. FIG. 4 shows the dependence of the thermal deformation amount of the recording medium 2 in the prior art shown in FIG. 1 upon the thickness of the thermal deformation suppressing film 8 of the medium 2. The radial range of the thermal deformation suppressing film 8 of the recording medium 2 is 7.5 to 22 mm. In the prior art shown in FIG. 4, the thickness of the thermal deformation suppressing film 8 that can suppress the thermal deformation amount of the medium 2 to zero is 200 nm at an inner circumference (r25 mm) and 240 nm at an outer circumference (r40 mm). Thus, the thermal deformation amount cannot be suppressed to zero at both the inner and outer circumferences with the same thickness of the thermal deformation suppressing film 8.

To the contrary, according to the first preferred embodiment wherein the radial range of the thermal deformation suppressing film 8 is 17 to 22 mm, the thermal deformation amount of the medium 2A at the inner circumference (r25 mm) is maintained at zero in the range of 160 to 300 nm for the thickness of the thermal deformation suppressing film 8 as shown in FIG. 3. Further, the thermal deformation amount of the medium 2A at the outer circumference (r40 mm) is zero with a thickness of 230 nm of the thermal deformation suppressing film 8 as shown in FIG. 3. Accordingly, by setting the thickness of the thermal deformation suppressing film 8 to 230 nm, the thermal deformation amount can be suppressed to zero at both the inner and outer circumferences. According to the present invention, the thermal deformation suppressing film 8 is formed preferably in the radial range of 13.5 to 22 mm from the center of the resin substrate 4, more preferably in the radial range of 17 to 22 mm from the center of the resin substrate 4 as mentioned above in the preferred embodiment.

The spindle 12 shown in FIG. 1 has a radius of 11.5 mm. Accordingly, although the radial range of the thermal deformation suppressing film 8 is set to 13.5 to 22 mm, the thermal deformation suppressing film 8 does not interfere with the spindle 12. The reason why the thermal deformation suppressing film 8 is preferably formed except the inner circumferential region 15 having a predetermined radial range as shown in FIG. 2 in comparison with the prior art shown in FIG. 1 is not clear in detail. However, it is estimated that the condition for cancellation of the substrate deformation phenomenon by the recording layer 6 is wider in the present invention characterized in that the thermal deformation suppressing film 8 is not formed in the inner circumferential region 15.

Figure 5A:
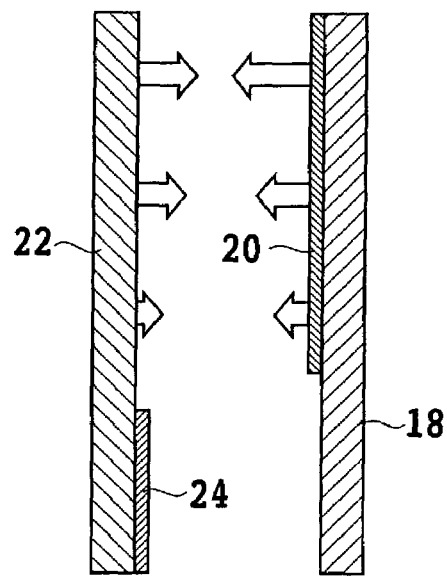
FIG. 5A is a schematic view for illustrating the operation of the prior art.
Figure 5B:
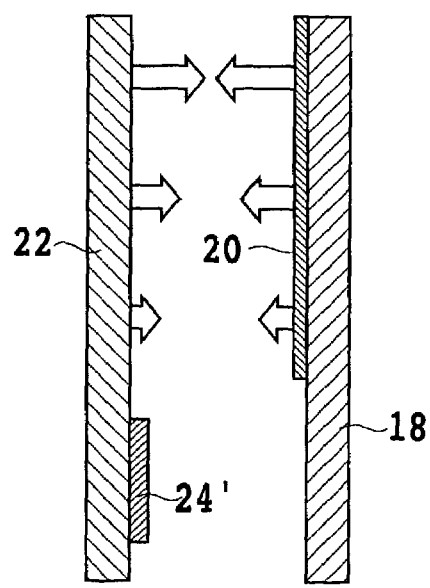
FIG. 5B is a schematic view for illustrating the operation of the present invention.

This will now be described in detail with reference to FIGS. 5A and 5B. FIG. 5A is a schematic view for illustrating the operation of the prior art, and FIG. 5B is a schematic view for illustrating the operation of the present invention. As shown in FIG. 5A, only a recording layer 20 is formed on a resin substrate 18, and only a thermal deformation suppressing film 24 is formed on a resin substrate 22. As shown in FIG. 5B, only a recording layer 20 is formed on a resin substrate 18, and only a thermal deformation suppressing film 24' is formed on a resin substrate 22. In FIGS. 5A and 5B, the arrows represent forces generated in the substrates 18 and 20 by a temperature change. If the forces generated in the substrate 22 from the inner circumference to the outer circumference thereof are made equal to those generated in the substrate 18 in each case by providing the thermal deformation suppressing film 24 or 24', the substrate 18 should not be deformed.

However, in the prior art shown in FIG. 5A, the deformation of the substrate 18 cannot be suppressed well in balance over the entire region of the substrate 18 in such a manner that when the forces generated in the substrate 22 at the inner circumference and the intermediate circumference thereof are made equal to those generated in the substrate 18 at the corresponding region, the force generated in the substrate 22 at the outer circumference thereof is not equal to that generated in the substrate 18 at the corresponding region. In contrast, according to the present invention shown in FIG. 5B, the degree of freedom of design is increased by providing the thermal deformation suppressing film 24' at an optimum position, so that the condition of cancellation of the substrate deformation phenomenon can be set so as to apply substantially the same forces generated in the substrate 18 over the entire region to the substrate 22.

The suppression of warpage of the recording medium 2A is also considered to be due to the following operation. In the case that the recording medium 2A is heated to incur thermal deformation, the medium 2A is warped to the side of the first surface at the outer circumference of the reference plane of the spindle 12 shown in FIG. 1 as a point of action, and is also warped to the side of the second surface at the outer circumference of the thermal deformation suppressing film 8 as a point of action. These warpage operations in two different directions cancel each other to thereby suppress the thermal deformation of the recording medium 2A.

While the thermal deformation suppressing film 8 is an SiN film in this preferred embodiment, the material of the thermal deformation suppressing film 8 is not limited to SiN, but any materials having a thermal expansion coefficient smaller than that of the resin substrate 4 may be used for the film 8. Further, the structure of the thermal deformation suppressing film 8 may be a single-layer structure or a multilayer structure composed of various materials. Further, the thermal deformation suppressing film 8 may be bonded or printed to the resin substrate 4. In the case of using SiN as the material of the thermal deformation suppressing film 8, the thermal deformation suppressing film 8 has a thermal expansion coefficient smaller than that of the recording layer 6.

Figure 6:
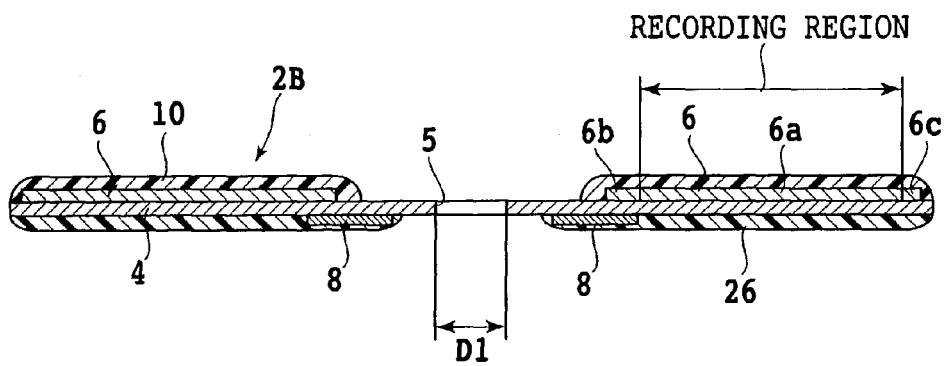
FIG. 6 is a sectional view of a recording medium according to a second preferred embodiment of the present invention.

FIG. 6 is a sectional view of a recording medium 2B according to a second preferred embodiment of the present invention. In this preferred embodiment, an organic protective film 26 is coated on the second surface of the resin substrate 4 so as to fully cover the thermal deformation suppressing film 8. The other configuration of this preferred embodiment is similar to that of the first preferred embodiment. The durability of the thermal deformation suppressing film 8 will now be examined. In the case of using a thin film of SiN or the like as the thermal deformation suppressing film 8, the thermal deformation suppressing film 8 has a problem in durability, and it is therefore necessary to coat the thermal deformation suppressing film 8 with the organic protective film 26 as in the second preferred embodiment shown in FIG. 6. The effectiveness of the organic protective film 26 will now be described.

Figure 7:
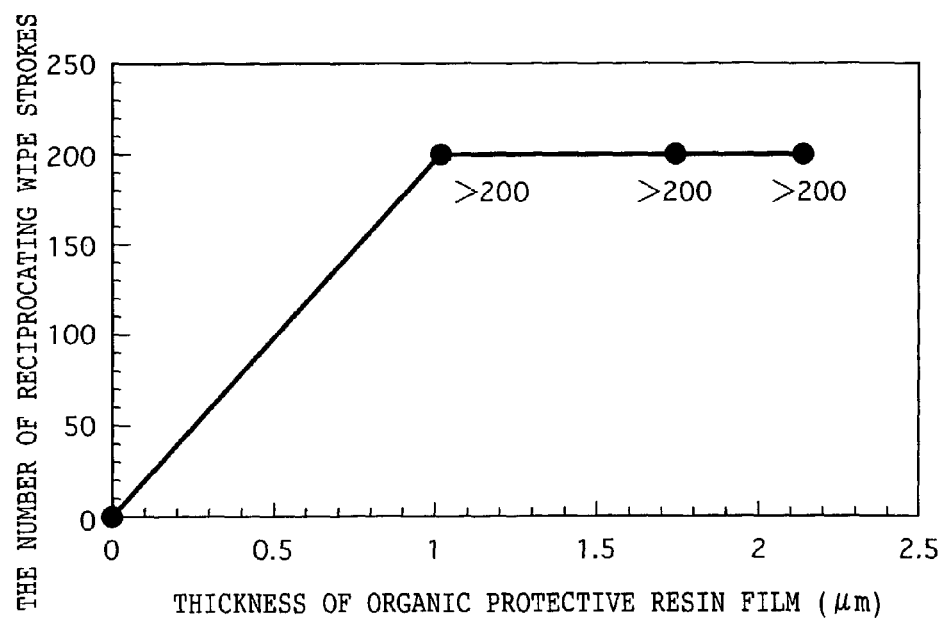
FIG. 7 is a graph showing the result of evaluation of the durability of the thermal deformation suppressing film by a wipe test.

FIG. 7 shows the result of evaluation of the durability of the thermal deformation suppressing film 8 by a wipe test. More specifically, an SiN film having a thickness of 165 nm as the thermal deformation suppressing film 8 was formed on a polycarbonate substrate by sputtering to evaluate the adhesion of the SiN film by the wipe test. The wipe test was made by wiping the SiN film with a swab impregnated with ethanol until the SiN film was separated off. In this wipe test, a load of 100 g was applied to the swab and a wiping speed was set to 500 mm/min. In the condition that the organic protective film 26 was not coated, the SiN film was separated off by five reciprocating strokes of the swab. To the contrary, in the case that the organic protective film 26 was coated as in the second preferred embodiment shown in FIG. 6, sufficient durability was obtained by setting the thickness of the SiN film to 1 μm or more.

Figure 8:
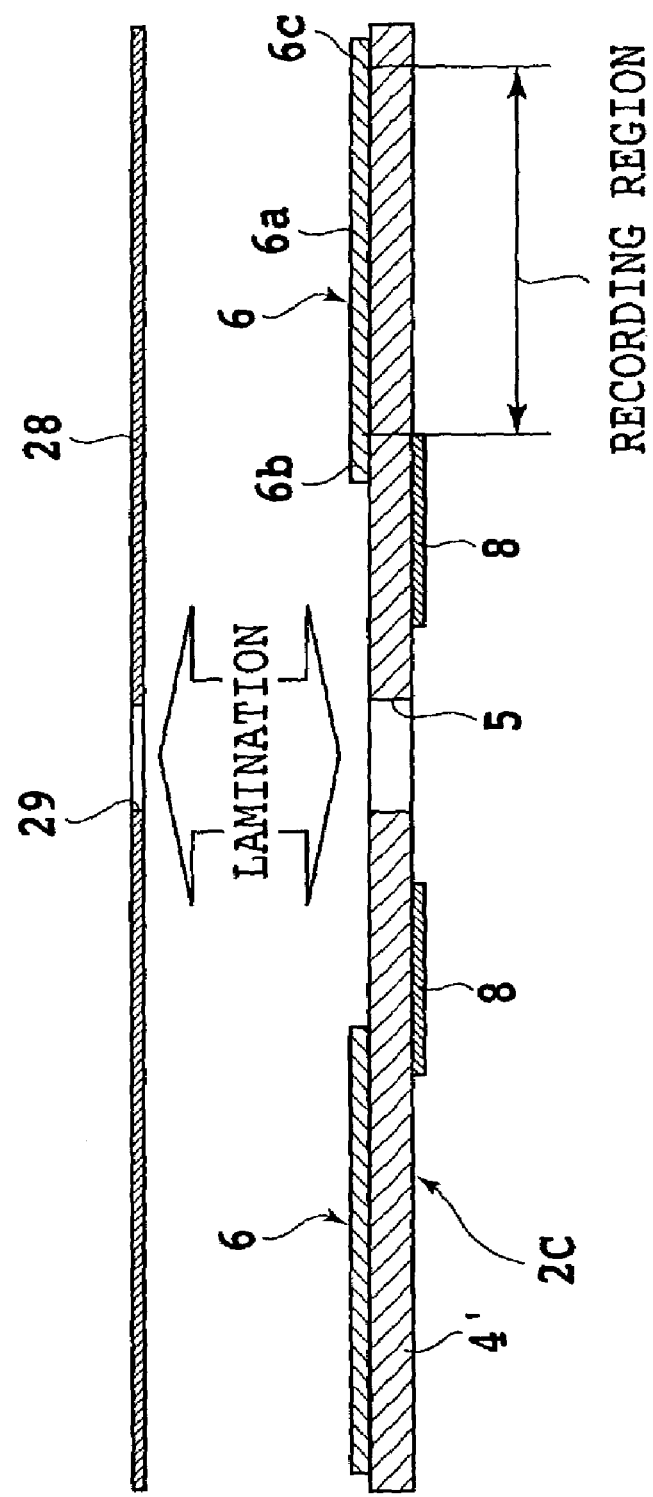
FIG. 8 is an exploded sectional view of a recording medium according to a third preferred embodiment of the present invention.

Referring to FIG. 8, there is shown an exploded sectional view of a recording medium 2C according to a third preferred embodiment of the present invention. While the resin substrate 4 in each of the previous preferred embodiments is a single-layer substrate, a similar effect can be obtained by using a multilayer or laminated substrate as shown in FIG. 8. That is, a dummy resin substrate 28 having a thickness of 0.1 mm is bonded to a resin substrate 4' having a thickness of 1.1 mm. A recording layer 6 is formed on the first surface of the resin substrate 4', and a thermal deformation suppressing film 8 is formed on the second surface of the resin substrate 4' as in the first preferred embodiment. The dummy resin substrate 28 has a center hole 29 having the same diameter as that of the center hole 5 of the resin substrate 4'. Also in the recording medium 2C having such a multilayer structure, the warpage due to a temperature rise can be suppressed.

Figure 9:
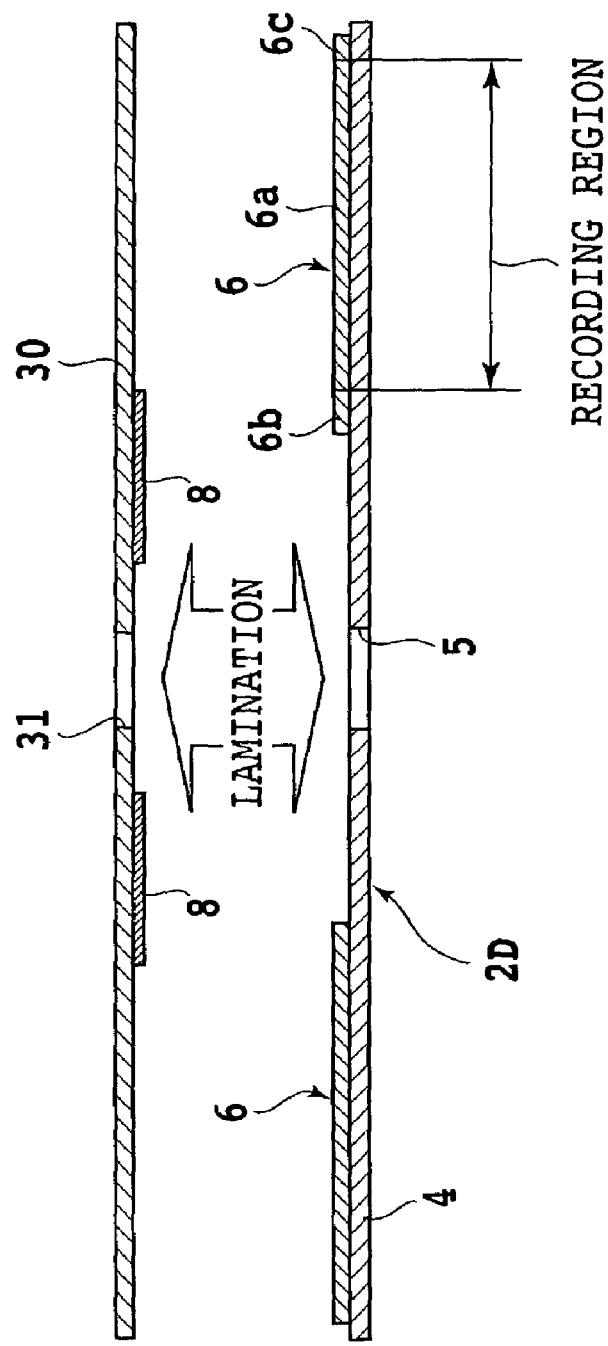
FIG. 9 is an exploded sectional view of a recording medium according to a fourth preferred embodiment of the present invention.

Referring to FIG. 9, there is shown an exploded sectional view of a recording medium 2D according to a fourth preferred embodiment of the present invention. In this preferred embodiment, a dummy resin substrate 30 having a thickness of 0.6 mm is bonded to a resin substrate 4 having a thickness of 0.6 mm. A recording layer 6 is formed on the first surface of the resin substrate 4. A thermal deformation suppressing film 8 is formed on one side surface of the dummy resin substrate 30 opposed to the first surface of the resin substrate 4. The dummy resin substrate 30 has a center hole 31 having the same diameter as that of the center hole 5 of the resin substrate 4. In the case that a temperature rise occurs, the resin substrate 4 is warped to the side of the first surface-on which the recording layer 6 is formed. To cancel this warpage of the resin substrate 4, the thermal deformation suppressing film 8 is formed on the surface of the dummy resin substrate 30 to which the first surface of the resin substrate 4 is bonded.

Figure 10:
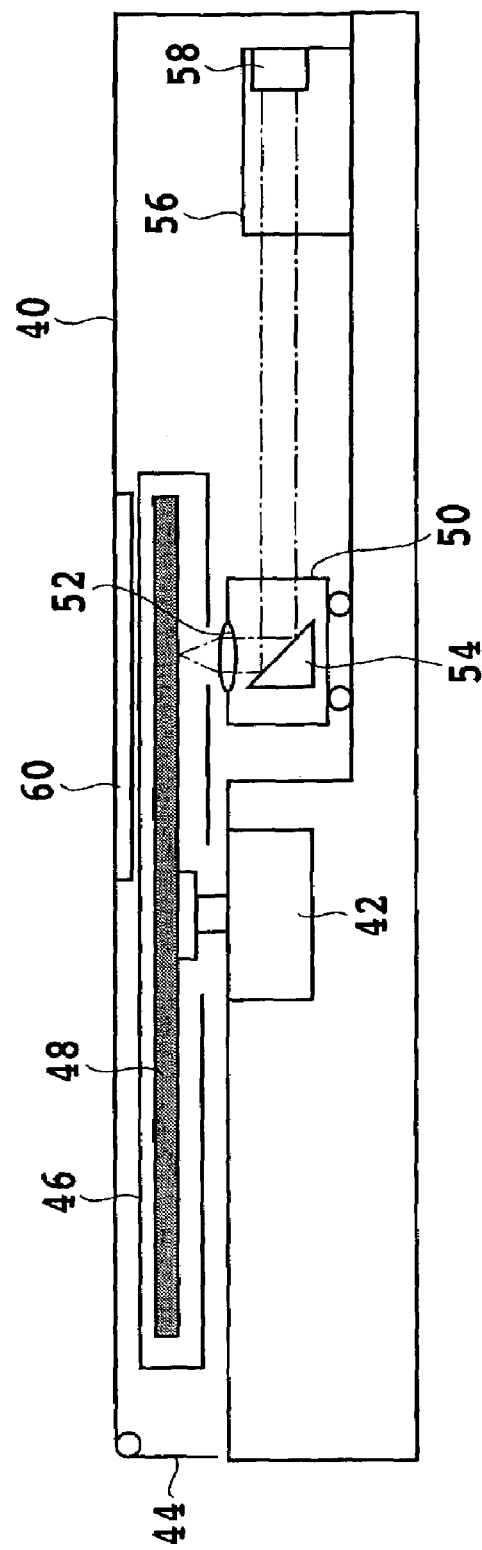
FIG. 10 is a schematic side view of a magneto-optical disk drive.

Referring to FIG. 10, there is shown a schematic side view of a magneto-optical disk drive to which a magneto-optical disk according to the present invention is applicable. Reference numeral 40 denotes a housing of the magneto-optical disk drive. A spindle motor 42 is provided in the housing 40. When a magneto-optical (MO) cartridge 46 is inserted through an inlet door 44 into the disk drive, a magneto-optical disk (MO disk) 48 in the MO cartridge 46 is chucked to a spindle hub of the spindle motor 42, thereby loading the MO disk 48.

A carriage 50 movable across the tracks of the medium by a voice coil motor (VCM) is provided below the MO disk 48 loaded. An objective lens 52 and a beam raising prism 54 are mounted on the carriage 50. A laser beam emitted from a laser diode 58 provided in a fixed optical unit 56 is reflected by the beam raising prism 54 to enter the objective lens 52, thereby focusing a beam spot on a recording surface of the MO disk 48.

The objective lens 52 is movable along its optical axis by a focus actuator, and also movable across the tracks of the MO disk 48 in a given range, e.g., across tens of tracks, by a track actuator. Further, an electromagnet 60 for applying an external magnetic field to the MO disk 48 loaded is provided above the MO disk 48.

According to the present invention as described above, it is possible to suppress the warpage of a recording medium using a resin substrate due to a change in ambient temperature or the like. As a result, a thin resin substrate can be adopted and a high-quality, high-density recording medium can be provided. Further, the technique of the present invention relating to a thermal deformation suppressing film and an organic protective film for protecting the thermal deformation suppressing film is effective to a resin substrate having any outer diameter and/or any thickness expected to be applied to a recording medium such as an optical disk by the adjustment of the film forming region and thickness of the thermal deformation suppressing film and the adjustment of the coating position of the organic protective film.

Further, according to the present invention, not only the warpage of the recording medium can be eliminated, but also the corrosion of the recording film, the loss in optical characteristics, the recording/reproduction error, etc. can be prevented in consideration of the compatibility with an optical storage device handling the recording medium. Accordingly, the margin of an optical storage device in response to high-speed access to the recording medium can be improved to thereby achieve high-density recording on the recording medium.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A recording medium comprising:
    a resin substrate having a first thermal expansion coefficient, a center hole, a first surface, and a second surface opposite to said first surface;
    a recording layer formed on said first surface of said resin substrate, said recording layer having a recording region, an inner nonrecording region formed inside the inner periphery of said recording region, and an outer nonrecording region formed outside the outer periphery of said recording region;
    a protective layer formed on said first surface of said resin substrate so as to cover said recording layer; and
    a thermal deformation suppressing layer formed on said second surface of said resin substrate except in an inner peripheral region having a predetermined range from said center hole, a region corresponding to said recording region, and a region corresponding to said outer nonrecording region,
    said thermal deformation suppressing layer having a second thermal expansion coefficient smaller than said first thermal expansion coefficient.

2. A recording medium according to claim 1, wherein said resin substrate is circular.

3. A recording medium according to claim 2, wherein said thermal deformation suppressing layer is formed in the range of 13.5 to 22 mm along the radius of said resin substrate from the center thereof.

4. A recording medium according to claim 3, wherein said thermal deformation suppressing layer is formed in the range of 17 to 22 mm along the radius of said resin substrate from the center thereof.

5. A recording medium according to claim 1, wherein said recording layer is optically recordable.

6. A recording medium according to claim 1, wherein said recording layer has a third thermal expansion coefficient smaller than said first thermal expansion coefficient.

7. A recording medium according to claim 6, wherein said second thermal expansion coefficient is smaller than said third thermal expansion coefficient.

8. A recording medium according to claim 7, wherein said thermal deformation suppressing layer is formed of SiN.

9. A recording medium according to claim 1, further comprising a second protective layer formed on said second surface of said resin substrate so as to cover said thermal deformation suppressing layer.

10. A recording medium according to claim 1, wherein said thermal deformation suppressing layer is bonded to said resin substrate.

11. A recording medium according to claim 1, wherein said thermal deformation suppressing layer is formed by any one of sputtering, evaporation, and printing.

12. A recording medium comprising:
a resin substrate having a first thermal expansion coefficient, a first center hole, a first surface, and a second surface opposite to said first surface;
a recording layer formed on said first surface of said resin substrate, said recording layer having a recording region, an inner nonrecording region formed inside the inner periphery of said recording region, and an outer nonrecording region formed outside the outer periphery of said recording region;
a thermal deformation suppressing layer formed on said second surface of said resin substrate except in an inner peripheral region having a predetermined range from said first center hole, a region corresponding said recording region, and a region corresponding to said outer nonrecording region,
said thermal deformation suppressing layer having a second thermal expansion coefficient smaller than said first thermal expansion coefficient; and
a dummy resin substrate bonded to said first surface of said resin substrate, said dummy resin substrate having a second center hole aligned with said first center hole.

13. A recording medium comprising:
a resin substrate having a first thermal expansion coefficient, a first center hole, and a first surface;
a recording layer formed on said first surface of said resin substrate, said recording layer having a recording region, an inner nonrecording region formed inside the inner periphery of said recording region, and an outer nonrecording region formed outside the outer periphery of said recording region;
a dummy resin substrate bonded to said first surface of said resin substrate, said dummy resin substrate having a surface opposed to said first surface of said resin substrate and a second center hole aligned with said first center hole; and
a thermal deformation suppressing layer formed on said opposed surface of said dummy resin substrate except in an inner peripheral region having a predetermined range from said second center hole, a region corresponding to said recording region, and a region corresponding to said outer nonrecording region,
said thermal deformation suppressing layer having a second thermal expansion coefficient smaller than said first thermal expansion coefficient.

14. An optical storage device capable of at least reading information recorded on an optical recording medium, comprising:
a light source for emitting a light beam;
an optical head for focusing said light beam on said optical recording medium; and
a photodetector for generating a reproducing signal from light reflected on said optical recording medium according to said light beam;
said optical recording medium comprising:
a resin substrate having a first thermal expansion coefficient, a center hole, a first surface, and a second surface opposite to said first surface;
a recording layer formed on said first surface of said resin substrate, said recording layer having a recording region, an inner nonrecording region formed inside the inner periphery of said recording region, and an outer nonrecording region formed outside the outer periphery of said recording region;
a protective layer formed on said first surface of said resin substrate so as to cover said recording layer; and
a thermal deformation suppressing layer formed on said second surface of said resin substrate except in an inner peripheral region having a predetermined range from said center hole, a region corresponding to said recording region, and a region corresponding to said outer nonrecording region,
said thermal deformation suppressing layer having a second thermal expansion coefficient smaller than said first thermal expansion coefficient.

15. An optical storage device capable of at least reading information recorded on an optical recording medium, comprising:
a light source for emitting a light beam;
an optical head for focusing said light beam on said optical recording medium; and
a photodetector for generating a reproducing signal from light reflected on said optical recording medium according to said light beam;
said optical recording medium comprising:
a resin substrate having a first thermal expansion coefficient, a first center hole, a first surface, and a second surface opposite to said first surface;
a recording layer formed on said first surface of said resin substrate, said recording layer having a recording region, an inner nonrecording region formed inside the inner periphery of said recording region, and an outer nonrecording region formed outside the outer periphery of said recording region;
a thermal deformation suppressing layer formed on said second surface of said resin substrate except in an inner peripheral region having a predetermined range from said first center hole, a region corresponding to said recording region, and a region corresponding to said outer nonrecording region,
said thermal deformation suppressing layer having a second thermal expansion coefficient smaller than said first thermal expansion coefficient; and a dummy resin substrate bonded to said first surface of said resin substrate, said dummy resin substrate having a second center hole aligned to said first center hole.

16. An optical storage device capable of at least reading information recorded on an optical recording medium, comprising:
a light source for emitting a light beam;
an optical head for focusing said light beam on said optical recording medium; and
a photodetector for generating a reproducing signal from light reflected on said optical recording medium according to said light beam;
said optical recording medium comprising:
a resin substrate having a first thermal expansion coefficient, a first center hole, and a first surface;
a recording layer formed on said first surface of said resin substrate, said recording layer having a recording region, an inner nonrecording region formed inside the inner periphery of said recording region, and an outer nonrecording region formed outside the outer periphery of said recording region;
a dummy resin substrate bonded to said first surface of said resin substrate, said dummy resin substrate having a surface opposed to said first surface of said resin substrate and a second center hole aligned to said first center hole; and a thermal deformation suppressing layer formed on said opposed surface of said dummy resin substrate except in an inner peripheral region having a predetermined range from said second center hole, a region corresponding to said recording region, and a region corresponding to said outer nonrecording region, said thermal deformation suppressing layer having a second thermal expansion coefficient smaller than said first thermal expansion coefficient.

17. A recording medium comprising:

a resin substrate having a first thermal expansion coefficient, a center hole, a first surface, and a second surface opposite to said first surface;

a recording layer formed on said first surface of said resin substrate, said recording layer having a recording region, an inner nonrecording region formed inside the inner periphery of said recording region, and an outer nonrecording region formed outside the outer periphery of said recording region;

one of a protective layer or a dummy resin substrate formed on said first surface of said resin substrate so as to cover said recording layer; and a thermal deformation suppressing layer formed on one of said second surface of said resin substrate or said dummy resin substrate, wherein said thermal deformation suppressing layer is spaced a predetermined distance from said center hole, such that an inner circumferential region lacks said thermal deformation suppressing region, said thermal deformation suppressing layer having a second thermal expansion coefficient smaller than said first thermal expansion coefficient.

* * * * *

UNITED STATES PATENT AND TRADEMARK OFFICE
CERTIFICATE OF CORRECTION

PATENT NO.        : 7,236,450 B2                                                Page 1 of 1
APPLICATION NO. : 10/358819
DATED             : June 26, 2007
INVENTOR(S)       : Hideaki Takahashi and Tetsuo Hosokawa It is certified that error appears in the above-identified patent and that said Letters Patent is hereby corrected as shown below:

IN THE ISSUED PATENTI:

In the Claims:

Column 12, line 43, after "expansion coefficient; and" start new paragraph.

Signed and Sealed this

Twenty-ninth Day of April, 2008

JON W. DUDAS
*Director of the United States Patent and Trademark Office*